United States Patent Office 3,338,850
Patented Aug. 29, 1967

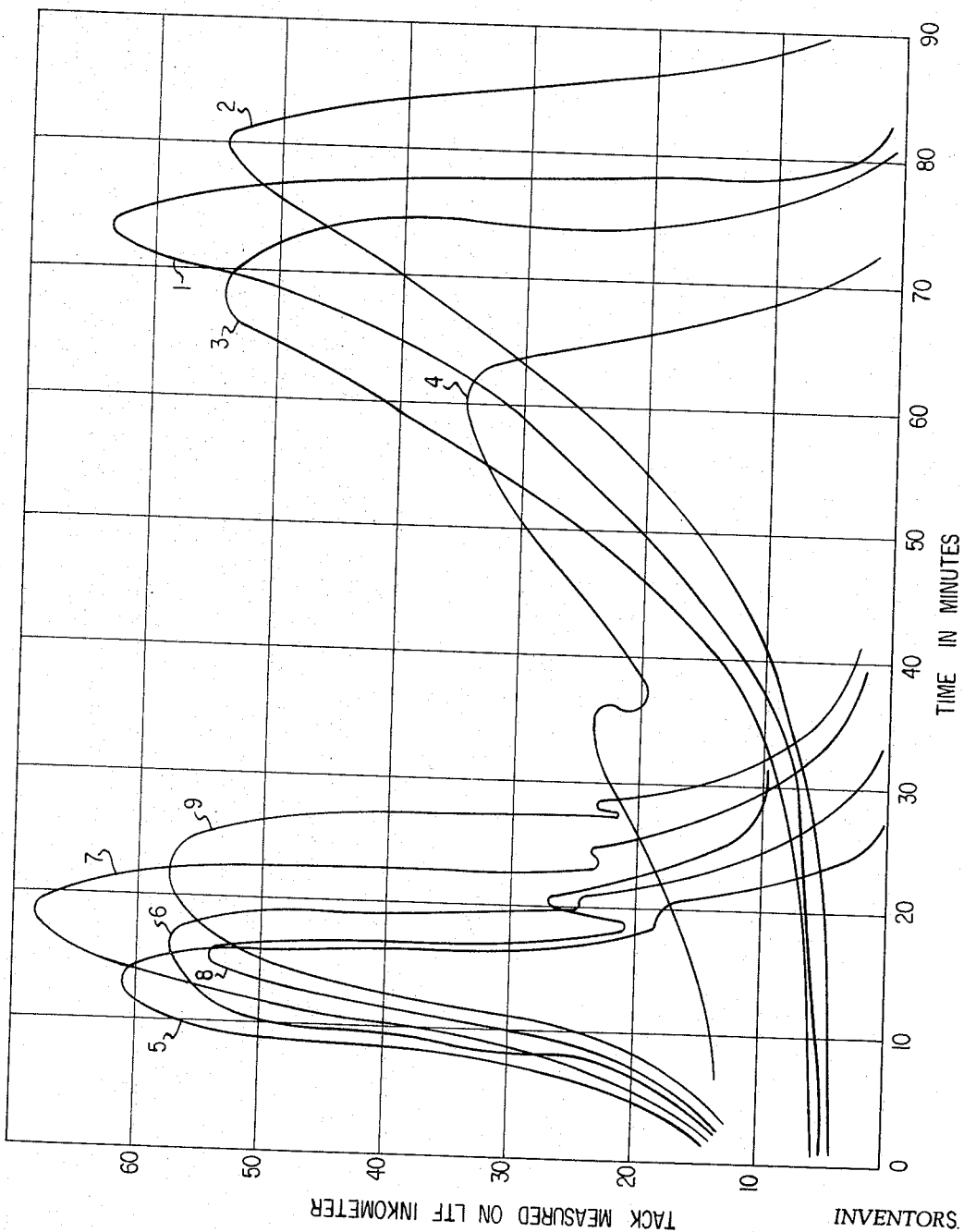

3,338,850
FUMARIC ACID-ROSIN ADDUCT/POLYESTER VARNISH MOISTURE-SET INK VEHICLE AND INK COMPOSITIONS
Joseph D. Sbarra, Endwell, and Paul Chebiniak, Binghamton, N.Y., assignors to International Business Machines Corporation, Armonk, N.Y., a corporation of New York
Filed May 6, 1965, Ser. No. 453,731
4 Claims. (Cl. 260—7.5)

The present invention relates generally of the manufacture of moisture-set ink vehicles and ink compositions. More specifically, the invention is concerned with new vehicles for use in the preparation of fast drying, moisture-set inks.

Moisture-set inks are well known in the art and generally comprise pigments and a resinous vehicle which is precipitated or set in the presence of high relative humidity. Conventionally, the freshly printed ink is exposed to an atmosphere of steam in order to accelerate setting.

The previously available moisture-set inks have not been found to be entirely satisfactory for one or more reasons, such as, slow drying and off-set or insufficiently dark or intense images due to lack of tinctorial strength.

Much of the printing with available moisture-set inks is currently done on relatively slow flat-bed printing machines and, even in such low-speed printing, off-set from one printed sheet to a superimposed printed sheet is still experienced.

Due to the fact that conventional moisture-set inks are so slow to dry, their use in faster systems, such as high-speed rotary printers, has thus far been entirely impractical.

Vehicles in inks now in general use are also deficient in the amount of pigment that they are able to carry. When used in dry offset printing, for example, the thin ink deposit does not contain sufficient pigmentation to provide images of the desired blackness or intensity. Efforts to provide a moisture-set ink having tinctorial strength sufficient to obtain images by dry offset printing of comparable intensity to images produced by letterpress printing have thus far been unsuccessful.

Therefore, a primary object of the present invention is to provide a vehicle for moisture-set inks and ink compositions containing such a vehicle which are characterized by drying speeds far more rapid than those of conventional moisture-set inks.

Another object of the present invention is to provide fast drying, moisture-set inks which have high tinctorial power.

An additional object of the present invention is to provide moisture-set inks having such rapid drying speed that they may be employed in high-speed printing systems without offset.

A further object of the present invention is to provide fast drying, moisture-set inks having high tinctorial strength so that they can be employed in dry offset printing processes and still produce intense images.

The manner in which the above objects and many other highly desirable objects and advantages are achieved will be more fully appreciated in the light of the following detailed description of the invention.

The present invention comprises a vehicle for fast drying, moisture-set inks which is a blend of at least two moisture-set varnishes, one having a relatively low acid value and another having a relatively high acid value. The invention further comprises moisture-set inks incorporating such a vehicle.

Where reference is made in the present specification and claims to varnishes of relatively low acid value, a value of below about 50 is intended. A varnish of relatively high acid value is one having an acid value of over 100.

Underlying the present invention is the discovery that a blend of varnishes of relatively high and relatively low acid values provides a vehicle for moisture-set inks which dries up to 45% faster than commercially available inks. Moreover, such inks have been found to meet all the requirements of high speed printing and to provide high pigment loading and low offset.

In a preferred embodiment, the ink vehicle of the present invention comprises a blend of a major portion of a fumaric acid-rosin varnish of relatively high acid value and a polyester varnish of relatively low acid value.

The fumaric acid-rosin varnish comprises a solution of a fumaric acid-rosin adduct in a solvent, usually a glycol or mixture of glycols, such as ethylene glycol. The solution ordinarily contains about 60% solids, has a viscosity of from about 400 to 550 poises, and has an acid value of from 145 to 155.

Rosin is a natural product consisting of about 90% resin acids and 10% neutral materials. The major resin acid component is abietic acid. Thus, a major portion of the adduct of fumaric acid and rosin is believed to be the adduct of fumaric acid and abietic acid.

The polyester varnish of relatively low acid value which makes up a minor portion of the vehicle is preferably a phthalic anhydride polyester formed by reacting 48.5% phthalic anhydride, 43.5% pentaerythritol, 5.0% maleic anhydride and 3.0% zein. These ingredients are preferably reacted in a vehicle consisting of butyl carbitol (diethylene glycol monobutyl ether) and ethylene glycol. The resulting varnish is a 50% solids solution having an acid value of about 26.

The low acid value polyester varnish may also be an epoxy based polyester varnish. For example, bisphenol A (isopropylidene bisphenone) having the formula

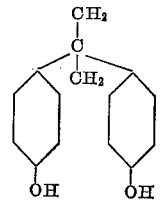

or tetrachlorobisphenol A and 3,4-epoxy-6-methylcyclohexanecarboxylate (Unox Epoxide 201) having the formula

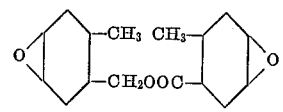

may be used in such varnishes. A useful formulation of a satisfactory epoxy varnish comprises about a 50% solution of the low acid value epoxy based polyester in a suitable solvent, such as ethylene glycol. The varnish also may comprise a small amount of hardener for the epoxy polyester. Anhydride-polyol combinations, such as maleic anhydride and 1,2,6-hexanetriol, are the best general purpose hardener systems for epoxy-type resins. Other curing agents which may be used in the epoxy polyester varnishes include, primary-secondary aliphatic amines, such as, ethylene diamine, hydroxy aliphatic amines, such as, N-(hydroxyethyl) diethylene triamine, aliphatic primary-tertiary amines, such as, dimethylamino propylamino, etc.

Various solvents may be used for the varnish vehicles of this invention, but generally the lower glycols, such as ethylene glycol and diethylene glycol, are preferred. Butyl carbitol may also be used in mixture with the glycols.

The relatively high acid value fumaric acid-rosin varnish preferably comprises the major portion of the varnish blend. For example, in one preferred formulation the ratio of fumaric acid-rosin varnish to the low acid value polyester varnish is about 4 to 1.

The vehicle of the present invention may be mixed with conventional pigments, dyes, solvents and other ink ingredients according to known practice to provide the superior moisture-set inks of the present invention.

To demonstrate the advantages of inks formulated from the present vehicles, comparative tests were conducted with conventional moisture-set ink compositions.

Each ink formulation was tested in a standard LTF Inkometer, Model B-45, Thwing Albert Instrument Co. The LTF (Lithographic Technical Foundation) Inkometer is an instrument which measures the force required to split an ink film. The test is used in this case to test the drying time of moisture-set ink compositions.

In a controlled atmosphere, the glycol solvents of the moisture-set inks absorb moisture. As more moisture is absorbed, the ink gets tackier. Finally a point is reached where no more moisture can be absorbed and the resin components of the varnish vehicle are rapidly precipitated. At this point, corresponding to the drying of the ink, the tackiness of the ink film drops sharply.

Thus, the LTF Inkometer provides a test for the drying speed of inks in terms of tackiness versus time. In actual use, moisture-set inks are usually exposed to steam which greatly accelerates the drying time, but the present test provides a useful method for comparing the relative drying speeds of moisture-set inks under carefully controlled atmospheric conditions.

Inks having compositions as set forth in the following table were prepared in accordance with standard practice. The amount of each ingredient is stated in parts by weight.

The relative amounts of pigment, diethylene glycol and varnish vehicle may be varied over wide ranges. A particular advantage of the invention is that the vehicle permits high pigment loading, so relatively high proportions of pigment may be present in the formulations. Generally the varnish vehicle will comprise about 50% or more of the ink, with the balance of the composition made up of amounts of pigment and diethylene glycol of the same magnitude.

Results similar to those obtained with formulations 5–9 are obtained by substituting low acid value epoxy polyester based varnishes for the phthalic anhydride polyester varnish ingredient of the composition. For example, a satisfactory fast drying ink may be formulated using a vehicle which comprises 4 parts of a high acid value 60% solution of fumaric acid-rosin adduct in ethylene glycol and 1 part of the following epoxy based polyester:

| | Parts |
|---|---|
| "Unox Epoxide 201" | 31.5 |
| Pentaerythritol | 16.5 |
| Maleic anhydride | 2.0 |
| Ethylene glycol | 50.0 |

A particularly preferred ink composition in accordance with the present invention has the following composition:

| | Parts |
|---|---|
| High acid value fumaric acid-rosin adduct varnish (60% solution in ethylene glycol) | 240 |
| Low acid value phthalic anhydride polyester varnish (50% solution in ethylene glycol) | 60 |
| Carbon black | 125 |
| Diethylene glycol | 100 |
| Carbowax 6000 | 25 |
| Toner (blue) | 5 |

TABLE

| Ingredient | Moisture-Set Ink Formulation Number | | | | | | | | |
|---|---|---|---|---|---|---|---|---|---|
| | 1 | 2 | 3 | 4 | 5 | 6 | 7 | 8 | 9 |
| Diethylene Glycol | 30 | 20 | 30 | 20 | 20 | 20 | 40 | 20 | 40 |
| Carbon Black | 20 | 20 | 20 | 20 | 18 | 18 | 50 | 18 | 40 |
| Toner | | | | | 5 | 5 | 10 | 5 | 10 |
| Polyethylene Compound 1055 | | | | | | | | 5 | |
| Carbowax 1500 | | | | | | | 10 | | 10 |
| Varnish Vehicle: | | | | | | | | | |
| Superior 60/40 Hy-Dry | 50 | | | | | | | | |
| ADM 402 | | 60 | | | | | | | |
| Essar 813 | | | 50 | | | | | | |
| ADM 404 | | | | 60 | | | | | |
| 60% solution of fumaric acid-rosin adduct in ethylene glycol, acid value 145–155 | | | | | 48 | 45 | 96 | 48 | 96 |
| 50% solution of phthalic anhydride polyester, in ethylene glycol, acid value 26 | | | | | 12 | 12 | 24 | 12 | 24 |
| 60% phthalic anhydride polyester-styrene copolymer blended with rosin adduct in diethylene glycol | | | | | | 3 | | | |

Ink formulations 1–4, are based on various commercially available varnish vehicles for moisture-set inks. Formulations 5–9 are based on the vehicles of the present invention.

Each ink was tested in the LTF Inkometer and Tack versus Time curves were plotted, as shown on the accompanying graph. As will readily be seen, the inks incorporating conventional vehicles required from about 70 to 90 minutes to lose their tack. However, ink formulations in accordance with the present invention required only about 20 to 40 minutes to dry. The curves on the graph bear the same numbers as the numbers of the ink formulations in the above table from which the curve was plotted.

As will be seen from the table, various amounts of toner may be added to the inks to improve their tinctorial power, and polyethylene compounds, carbowax and similar agents may be added to improve the slip of materials printed with such inks.

It will be obvious to those skilled in the art that the ingredients and proportions of the present compositions can be varied without departing from the scope of the invention as expressed in the following claims.

What is claimed is:

1. A vehicle for fast drying moisture-set printing inks consisting of a mixture of
   a major portion of a fumaric acid-rosin adduct in a glycol solvent having an acid value of 145–155 and
   a minor portion of a polyester varnish having an acid value below about 50 comprising
   the reaction product of 48.5% phthalic anhydride, 43.5% pentaerythritol, 5.0% maleic anhydride and 2% zein.

2. An ink vehicle as described in claim 1 wherein said polyester is the reaction product of pentaerythritol, 3,4-epoxy-6-methylcyclohexanecarboxylate, maleic anhydride and ethylene glycol.

3. An ink vehicle as described in claim 2 further consisting of a hardener for said epoxy based polyester.

4. A fast drying moisture-set ink consisting of a major portion of a fumaric acid-rosin adduct in a glycol solvent having an acid value of 145–155 and a minor portion of phthalic anhydride polyester varnish solution having an acid value of less than about 50 comprising
  the reaction product of 48.5% phthalic anhydride, 43.5% pentaerythritol, 5.0% maleic anhydride and 2% zein,
carbon black, and
diethylene glycol.

References Cited

UNITED STATES PATENTS

| | | | |
|---|---|---|---|
| 2,181,054 | 11/1939 | Hampton et al. | 260—26 |
| 2,236,521 | 4/1941 | Coleman | 260—7.5 |
| 2,335,882 | 12/1943 | Pingarron | 260—7.5 |
| 2,581,335 | 1/1952 | Earhart et al. | 260—26 |
| 2,887,459 | 5/1959 | Carmedy | 260—26 |
| 3,217,066 | 11/1965 | Greenspan et al. | 260—40 |

WILLIAM H. SHORT, *Primary Examiner.*

E. M. WOODBERRY, *Assistant Examiner.*